United States Patent
Richards et al.

(10) Patent No.: US 9,015,146 B2
(45) Date of Patent: Apr. 21, 2015

(54) MANAGING ACCESS TO DATA IN A MULTI-TEMPERATURE DATABASE

(75) Inventors: Anita Richards, San Juan Capistrano, CA (US); Douglas P. Brown, Rancho Santa Fe, CA (US)

(73) Assignee: Teradata US, Inc., Dayton, OH (US)

( * ) Notice: Subject to any disclaimer, the term of this patent is extended or adjusted under 35 U.S.C. 154(b) by 478 days.

(21) Appl. No.: 11/565,757

(22) Filed: Dec. 1, 2006

(65) Prior Publication Data
US 2008/0133456 A1 Jun. 5, 2008

(51) Int. Cl.
*G06F 17/30* (2006.01)

(52) U.S. Cl.
CPC .... *G06F 17/30477* (2013.01); *G06F 17/30306* (2013.01)

(58) Field of Classification Search
USPC .................................. 707/200, 713, 721, 719
See application file for complete search history.

(56) References Cited

U.S. PATENT DOCUMENTS

| | | | |
|---|---|---|---|
| 7,089,258 B1 * | 8/2006 | Brown et al. .................... | 1/1 |
| 2003/0158842 A1 * | 8/2003 | Levy et al. ....................... | 707/3 |
| 2005/0165750 A1 * | 7/2005 | Shakib et al. ..................... | 707/3 |
| 2005/0192978 A1 * | 9/2005 | Lightstone et al. ........... | 707/100 |
| 2006/0069886 A1 * | 3/2006 | Tulyani .......................... | 711/161 |
| 2007/0226178 A1 * | 9/2007 | Ewen et al. ...................... | 707/2 |
| 2008/0005475 A1 * | 1/2008 | Lubbers et al. ............... | 711/118 |

OTHER PUBLICATIONS

Article entitled "Magic Quadrant for Data Warehouse Database Management Systems", by Feinberg et al., dated Sep. 12, 2006.*
Article entitled "Teradata Dynamic Workload Manager User Guide", by Teradata, dated Sep. 2006.*
Article entitled Teradata Launches "Multi-Temperature" Data Warehousing by NCR, dated Apr. 23, 2007.*
Article entitled "Multi-Temperature Data Warehousing with Teradata" by Teradata, Copyright 2007.*

* cited by examiner

*Primary Examiner* — Mahesh Dwivedi
(74) *Attorney, Agent, or Firm* — John D. Cowart; Ramin Mahboubian

(57) ABSTRACT

An optimization technique is provided that optimizes data access by mapping each table, or row and/or column in a table, to a particular query, depending on whether the data in said table, row or column is 'hot' or 'cold' data. In one aspect, the invention features a method for optimizing the access time of an SQL query to a database including data. The method includes receiving, for each query type, a data frequency access measure and associating each query type with a processing rule set, according to the received data frequency access measure.

23 Claims, 3 Drawing Sheets

MANAGING ACCESS TO DATA IN A MULTI-TEMPERATURE DATABASE

BACKGROUND

Relational database systems store data in tables organized by columns and rows. The tables typically are linked together by "relationships" that simplify the storage of data and allow a user to make complex queries against the database in an efficient manner. Structured Query Language (SQL) is a standardized language for creating and operating on relational databases.

A relational database system typically stores a broad range of information. Some information is accessed on a regular basis (e.g. recent sales figures) whereas other information may only be accessed on a sporadic or rare basis (e.g. mailing addresses for clients, or older, historical sales figures).

The relative frequency of access to information in a database is typically referred to in the art as the 'temperature' of the data (or database). That is, data that is accessed on a regular basis is considered to be 'hot' data and correspondingly, data that is rarely accessed is referred to as 'cold' data. A database that holds both hot and cold data is referred to in the art as a 'multi-temperature' database.

It is known to use multiple databases to each hold data of different temperatures. This improves access time to data, as the hot databases can be optimized for frequent access, and the cold databases can be optimized for infrequent access.

However, it is increasingly necessary to hold both hot and cold data in a single database, for a variety of technical and non-technical reasons. For example, it may be necessary, due to local laws and regulations, to keep all data in a single and easily accessible location. Alternatively, it may be beneficial to hold historical sales data (typically cold data) with recent sales data (typically hot data) so that useful marketing information may be extracted from the database.

SUMMARY

An optimization technique is provided that optimizes data access by mapping each table, or row and/or column in a table, to a particular query, depending on whether the data in said table, row or column is hot or cold data.

In general, in one aspect, the invention features a method for optimizing the access time of an SQL query to a database including data. The method includes receiving, for each query type, a data frequency access measure and associating each query type with a processing rule set, according to the received data frequency access measure.

Implementations of the invention may include one or more of the following. The method may further include determining the data frequency access measure by creating a plurality of views into data in the database, each view being dependent on the frequency with which data is accessed. The method may also include determining the frequency of the data access by determining the last date at which the data was accessed. In an alternative, the method includes determining said frequency measure by creating a plurality of views into data in each table in the database, each view being dependent on the frequency with which data is accessed. The method may also include determining said frequency measure by receiving from the SQL query a plurality of values indicative of the frequency with which the data was last accessed. In some embodiments, the method may also include determining said frequency measure by executing an SQL query, reviewing the intermediate products of the SQL query, and determining a frequency measure from the intermediate products. Each query type may be associated with a rule set by assigning query types that access data with a high access rate to a processing rule set that prioritizes execution of the query. Conversely, query types that access data with a low access rate may be assigned to a processing rule set that de-prioritizes execution of the query.

In general, in another aspect, the invention features a database system for accessing a database. The database system includes a massively parallel processing system, which includes one or more nodes, a plurality of CPUs, each of the one or more nodes providing access to one or more CPUs, a plurality of virtual processes each of the one or more CPUs providing access to one or more processes, each process configured to manage data stored in one of a plurality of data-storage facilities. The system also includes a management system for allocating a strategy for executing a query type, the management system being arranged to receive, for each query type, a data frequency access measure, and associate each query type with a processing rule set, according to the received data frequency access measure.

In general, in another aspect, the invention features a computer program, stored on a tangible storage medium, for use in allocating a strategy for executing a query type depending on the temperature of data contained within a table, including instructions which cause a computer to receive, for each query type, a data frequency access measure and associate each query type with a processing rule set, according to the received data frequency access measure.

Other features and advantages will become apparent from the description and claims that follow.

DETAILED DESCRIPTION

Figure 1:
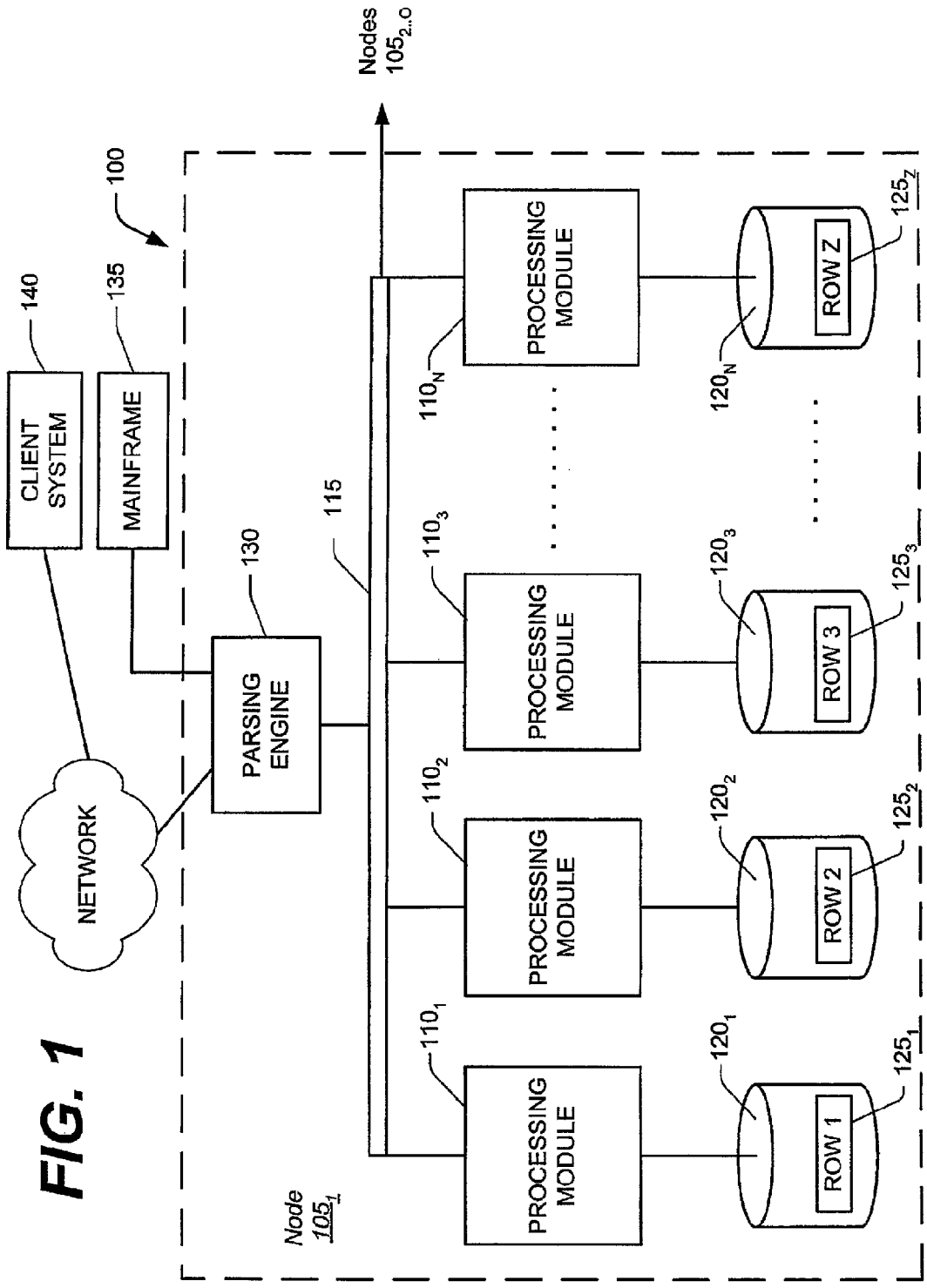
FIG. 1 is a block diagram of a node of a database system.

The technique for managing access to data in a multi-temperature database disclosed herein has particular application to large databases that can contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1...N}$, connected by a network 115 that manage the storage and retrieval of data in data storage facilities $120_{1...N}$. Each of the processing modules $110_{1...N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data storage facilities $120_{1 \ldots N}$. Each of the data storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data storage facilities $120_{1 \ldots N}$. The rows $125_{1 \ldots Z}$ of the tables are stored across multiple data storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data storage facilities $120_{1 \ldots N}$ in response to queries received from a user at a mainframe 135 or a client computer 140. The DBS 100 usually receives queries in a standard format, such as SQL.

Figure 2:
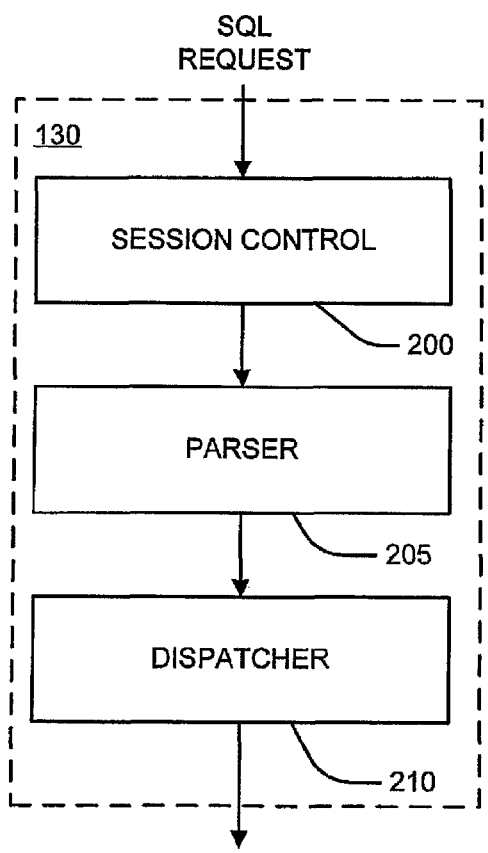
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
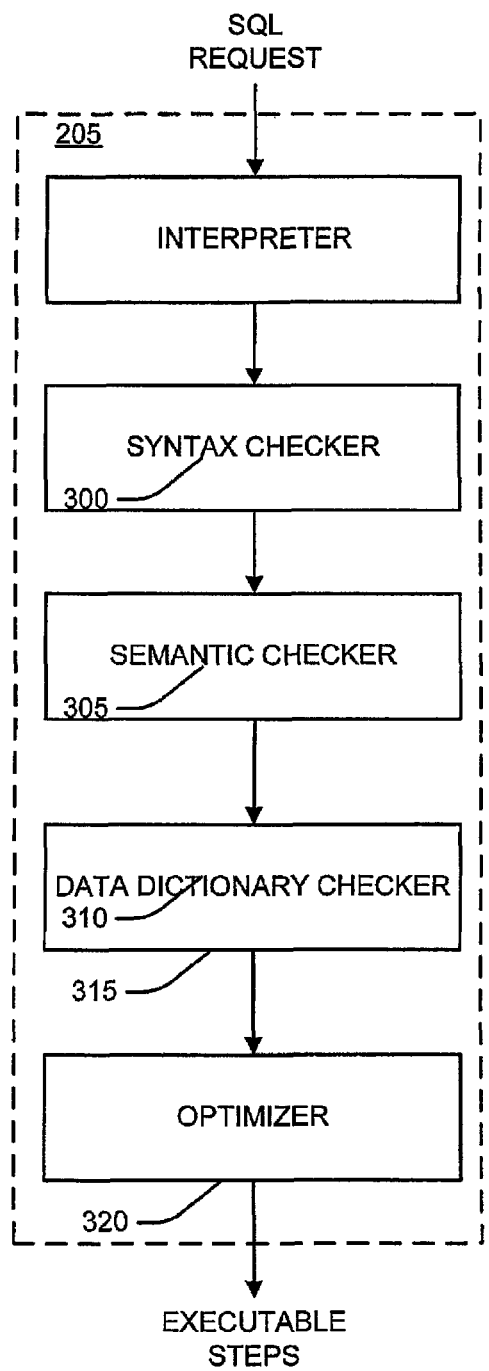
FIG. 3 is a flow chart of a parser.
Figure 4:
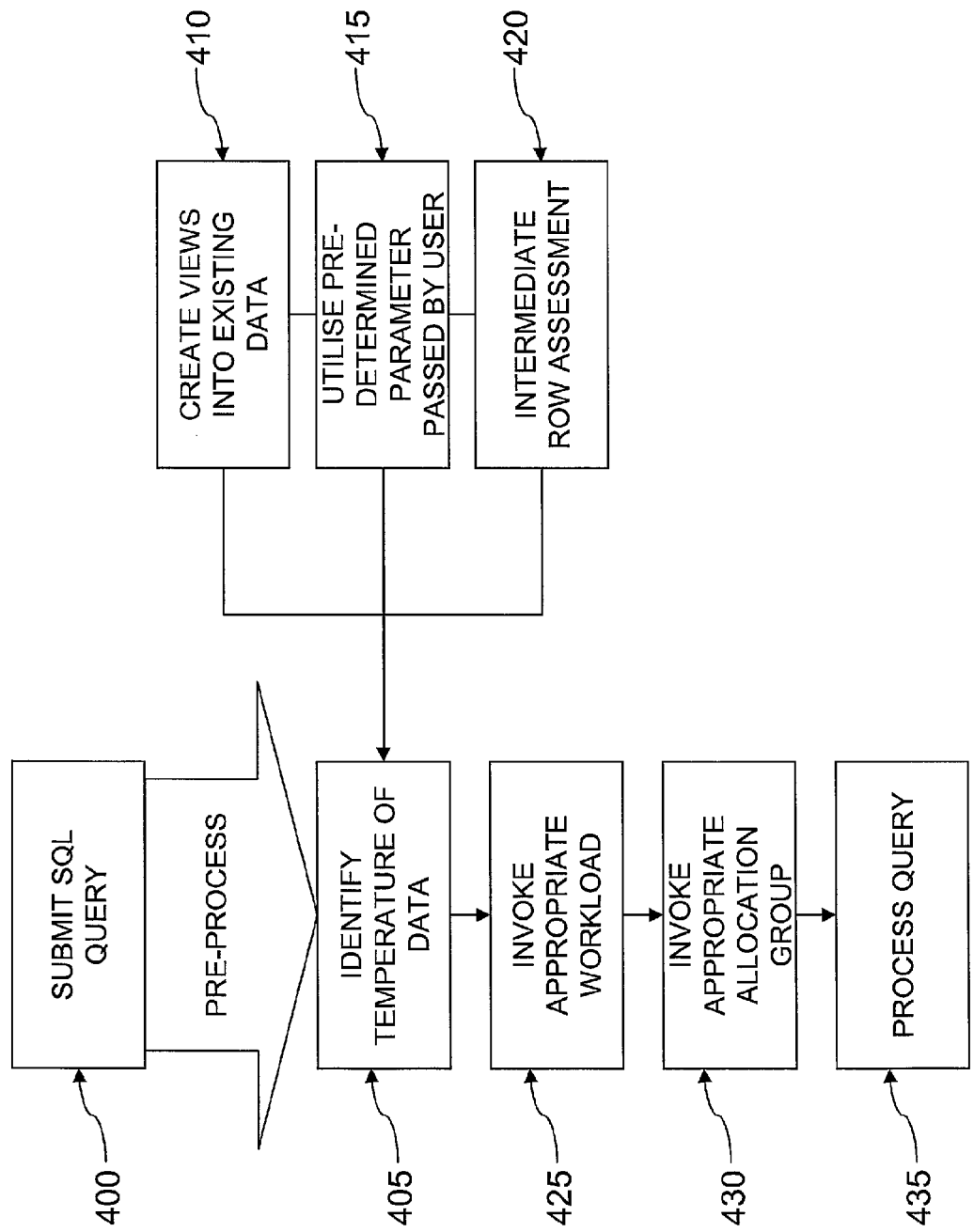
FIG. 4 is a flow chart of a technique for performing SQL queries in a multi-temperature environment.

Once the session control 200 allows a session to begin, a user may submit a SQL request that is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320) that develops the least expensive plan to perform the request.

The DBS described herein accepts performance goals for each workload (i.e. each collection of SQL requests) as inputs, and dynamically adjusts its own performance parameters, such as by allocating resources and throttling back incoming work, using the goals as a guide. In one example system, the performance parameters are called priority scheduler parameters. When the priority scheduler parameters are adjusted, weights assigned to resource partitions and allocation groups are changed. Adjusting how these weights are assigned modifies the way access to the CPU, disk and memory is allocated among requests. Given performance objectives for each workload and the fact that the workloads may interfere with each other's performance through competition for shared resources, the DBS may find a performance parameter setting that achieves one workload's goal but makes it difficult to achieve another workload's goal.

The performance goals for each workload will vary widely as well, and may or may not be related to their resource demands. For example, two workloads that execute the same application and DBS code could have differing performance goals simply because they were submitted from different departments in an organization. Conversely, even though two workloads have similar performance objectives, they may have very different resource demands.

One solution to the problem of automatically satisfying all workload performance goals is to use more than one mechanism to manage system workload. This is because each class can have different resource consumption patterns, which means the most effective parameter for controlling performance may be different for each workload. Manually managing the parameters for each workload becomes increasingly impractical as the workloads become more complex. Even if the DBS can determine which parameters to adjust, it must still decide in which dimension and how far each one should be turned. In other words, the DBS must translate a performance goal specification into a particular resource allocation that will achieve that goal.

One mechanism to manage system workload is to categorize SQL queries on the basis of the temperature of the data accessed by said queries. This is achieved by the implementation of a multi-temperature prioritization strategy. In other words, a workload's classification criteria, or "query characteristics" (i.e. "who" submitted the request, "what" will it do, "where" will it read its data from (tables, databases, views, rows, etc.) and what "exceptions" has it encountered) are arranged to consistently map to data temperature. Mapping hot and cold to a particular query provides a more consistent improvement in performance than mapping hot and cold to a particular user's account, especially when each user may submit a mix of hot and cold data accesses.

Implementing a multi-temperature prioritization on the basis of labeling each individual table in a database as a hot or cold table is one method which may be utilized to distinguish between multi-temperature data in a database. However, in some databases, historical tables can contain both hot and cold data on a row by row basis, depending on the age of the row. The DBS allows for intelligent mapping on the basis of access to individual rows and/or columns (or individual elements) in each table. Intelligent mapping is achieved by firstly determining a data frequency access measure for data in a database or a table.

One manner in which a data frequency access measure can be determined is by creating multiple views to the same table, where each view maps to either hot or cold data access. To take a first example:

```
Create View HotView... from tableXYZ where thedate < date-30;
Create View ColdView... from tableXYZ where thedate >= date-30;
```

As can be seen from the simple SQL pseudo-code given above, two views may be created for table XYZ based on which rows in the table have been accessed in the last 30 days, and which rows have not been accessed in the last 30 days. More sophisticated methodologies for creating views into a table may also be utilized. Data may be split into further categories, depending on the relative temperature of the data. In a second example, there may be a database operated by a large retailer, containing be over 5 years of sales data. The retailer may require the data to be split into at least four views, being hot, warm, cool and dormant, as follows:

```
Create View HotView from tableXYZ where thedate < date-90;
Create View WarmView from tableXYZ where thedate >= date-90 and date <date-390;
Create View CoolView from tableXYZ where thedate >= date-390 and date < date-1800;
Create View DormantView from tableXYZ where thedate >= date-1800;
```

In another example, appropriate data temperature characteristics may be discerned by investigating the intermediate results of particular instances of SQL queries. For example, appropriate criteria may be derived by investigating the intermediate row count which is generated when a query is pre-processed. After a SQL query is parsed (pre-processed) and before it is executed, data as to the most appropriate query plan execution path, the total number of row counts, the estimated time for completion, and other administrative data has already been calculated and recorded by the DBS.

In some cases, a step of the query plan will require a read from a large table and a portion of the read table will be copied to an intermediate (working) spool, so that it may be reused in a subsequent query plan step that requires access to the same portion of data. The portion of the table provides information on the estimated size of the intermediate spool. When large amounts of cold primary table data are accessed by a SQL query, the intermediate spools (temporary tables arranged to hold intermediate products of the SQL query) are large. If a large amount of data is being read from a primary table, then it can be assumed, in most situations, that the user is requesting a large amount of historical data. Conversely, reading a small amount of data from a table is suggestive of reading recent data. Consequently, a large volume of historical data is suggestive of cold data, whereas a small volume of recent data is suggestive of hot data. Therefore, by investigating the size and content of the intermediate spools and tracing back to the queries that generated the spools, assumptions can be made about whether such queries are accessing cold data or hot data. In one embodiment, the DBS may incorporate such assumptions into the step of estimating the temperature of the data being accessed by the query, particularly where a query does not fall into an existing temperature based view.

In yet another example, the SQL application may be programmed by a user (or may include a pre-programmed set of classification criteria, analogous to a rule set) to provide information to the DBS to allow the DBS to distinguish between hot data and cold data in a table. The data frequency access measure may be passed, for example, as an extra parameter which immediately precedes an SQL query. In one implementation, the parameter is passed through the "query_band" parameter, which is a command that allows the user (through the application) to pass on information about the request. This information, in turn, is provided to the workload. For example, the string syntax in one implementation is:

SET QUERY_BAND='queryband_string' FOR Session|Transaction where 'queryband_string' is a list of name/value pairs specifiable by the user (application).

For example:
SET QUERY_BAND='DataTemperature=hot' FOR SESSION

If the command shown above is included immediately before the SQL query, the DBS is informed that the proceeding SQL query will be for data that is hot. In other words, a variable or parameter which labels the table as containing hot data can be sent by the user. In the case where classification criteria is provided by the user, the initial step of creating a series of views into a table is not required, although it may be utilized to cross-check the veracity of the classification criteria, if so desired.

The temperature of data may vary according to an organization's definition of 'data temperature', the size of the database, and other factors. However, as a general rule, data which is regularly accessed (i.e. at least once in the last 30-45 days) is considered hot data, whereas any data not accessed for at least 30-45 days is considered cold data.

Once the relative temperature of data in a table (or in all tables) has been identified or estimated, corresponding workload classification criteria can be created to map the temperature of the data to a workload. In Teradata, a workload definition is a group or category which includes a collection of SQL query types that have a similar processing profile. Therefore, returning to the first example where views were created to categorize hot and cold data, the following workloads may be created:

WDHot includes classification criteria relevant to HotView.

WDCold includes classification criteria relavant to ColdView.

In an identical fashion, workloads can be allocated in a similar way to the views provided in the second example:

WDHot includes classification criteria relevant to HotView

WDWarm includes classification criteria relevant to WarmView

WDCool includes classification criteria relevant to CoolView

WDDormant includes classification criteria relevant to DormantView

Taking the first example, WDHot contains a list of SQL queries which require access to hot data, whereas WDCold contains a list of SQL queries which require access to cold data. In turn, a workload is then associated with an Allocation Group (AG). An AG provides the DBS with a set of rules that define how SQL requests within a workload should be allocated and processed. In other words, an AG defines the performance weight and the priority plan of the workload.

An AG will generally include a number of parameters or settings which define how system resources will be allocated to the workload. For example, in Teradata, the AG includes a weighting value and options for reserving AMP Worker Tasks ("AWT") (which is a database term that describes a process which is equivalent to reserving a "thread" or "process" in the Unix Operating System). The user may also add further constraints to the access of cold data, by allowing the use of concurrency throttles on queries which access cold data. A concurrency throttle limits the number of cold data access that can be performed by the system at any given time interval. For example, it could be decided that no more than two (2) concurrent cold data accesses may be performed and access delayed to maintain the specified concurrency. This throttle ensures that cold data accesses do not utilize a large proportion of system resources. The parameters and constraints allow the DBS to process queries by their relative order of importance, to ensure that queries which are most urgent are processed first, whereas non-important queries are processed last.

The manner in which workloads are created and managed and the manner in which workloads are associated (or mapped onto) AGs is, for example, outlined in U.S. Pat. No. 7,395,537, entitled ADMINISTERING THE WORKLOAD OF A DATABASE SYSTEM USING FEEDBACK, by Douglas P. Brown and Anita Richards, which is hereby incorporated by reference herein.

However, a simple example is presented to illustrate the method steps that are followed in processing a query to access data a multi-temperature database. A user submits a SQL query, such as:

SELECT total_sales FROM sales_table2006 WHERE (thedate<date-30)

The request requires a set of rows of data to be extracted from a table. The query is routed through the parser (block 205 of FIG. 2). The parser, in the example, determines that the set of rows to be extracted correspond to a data set which is identified as being part of HotView, the view into hot data (block 405).

The identification of the correct temperature of the database could be achieved utilizing any one (or a combination of) the techniques outlined above. That is, by determining whether the query fits in with a pre-defined view (block 410), by utilizing a set of pre-determined rules, as provided by a user (block 415) and/or by investigating the intermediate or pre-processing products of the query, to estimate the temperature of the data being accessed by the query (block 420).

Therefore, the workload WDHot is invoked (block 425). WDHot is associated with a high priority AG (block 430). In the present context, a high priority AG is one that requires the DBS to complete the SQL query as a priority over other queries submitted to the DBS. Therefore, the SQL query is given favorable treatment by the DBS to ensure efficient processing of the query (block 435).

The embodiment described herein provides the advantage of prioritizing requests for data that is regularly accessed while de-prioritizing SQL queries requiring access to data that is rarely accessed. Generally, SQL queries requiring access to hot data access smaller data sets, are more targeted (e.g. sales to a particular client), more frequent and require an immediate or fast response. For example, a client may wish to view their total purchases for the last month. To deal with such queries in a timely and efficient manner is advantageous. Queries for cold data usually access larger data sets, are more general in nature (e.g. a query for all sales to all clients in a state-wide area) and do not require an immediate response (e.g. a query for all sales data for the last 6 months, for use in compiling a marketing strategy). Therefore, there is generally no need to process cold data queries as a priority.

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other embodiments are also within the scope of the following claims.

We claim:

1. A computer-implemented method for facilitating optimization of access times of database queries made from a database, the computer-implemented-method comprising:
   obtaining a first data frequency access measure which is indicative of a frequency with which data stored in the database is accessed by a first database query type of the database queries;
   obtaining a second data frequency access measure which is indicative of a frequency with which data stored in the database is accessed by a second database query type of the database queries that is different from the first database query type, wherein the first and second data frequency access measures are each determined based on views, rules, and intermediates products associated with the database queries;
   assigning at least one processing rule for processing database queries of the first database query type, based on the first data frequency access measure;
   assigning at least one other processing rule for processing database queries of the second database query type, based on the second data frequency access measure; and
   wherein the at least one and at least one other processing rules respectively assign different priorities to execution queries of the first and second database query types.

2. The method of claim 1, further including:
   determining the data frequency access measure by creating a plurality of views into the database, each view being dependent on the frequency with which data is accessed.

3. The method of claim 2 further including:
   determining the frequency of the data access by determining the last date at which the data was accessed.

4. The method of claim 1, further including:
   determining the first data frequency access measure by creating a plurality of views into data in each table in the database, each view being dependent on the frequency with which data is accessed.

5. The method of claim 1, further including:
   determining the first data frequency access measure by receiving a plurality of values that are included with the query, where the values are indicative of the frequency with which the data was last accessed.

6. The method of claim 1, further including:
   determining the first data frequency access measure by executing a query,
   reviewing the intermediate products of the query, and
   determining a frequency measure from the intermediate products.

7. The method of claim 1, further including:
   associating each query type with a rule set by assigning query types that access data with a high access rate to a processing rule set that prioritizes execution of the query.

8. The method of claim 1, further including:
   associating each query type with a rule set by assigning query types that access data with a low access rate to a processing rule set that de-prioritizes execution of the query.

9. A database system that includes one or more processors operable to:
   obtain a first data frequency access measure which is indicative of a frequency with which data stored in the database is accessed by a first database query type of the database queries;
   obtain a second data frequency access measure which is indicative of a frequency with which the data stored in the database is accessed by a second database query type of the database queries that is different from the first database query type, wherein the first and second data frequency access measures are each determined based on views, rules, and intermediates products associated with the database queries;
   assign at least one processing rule for processing database queries of the first database query type, based on the first data frequency access measure;
   assign at least one other processing rule for processing database queries of the second database query type, based on the second data frequency access measure; and
   wherein the at least one and at least one other processing rules respectively assign different priorities to execution queries of the first and second database query types.

10. The database system of claim 9, wherein the one or more processors are further operable to:
    determine the data frequency access measure by creating a plurality of views into data in the database, each view being dependent on the frequency with which data is accessed.

11. The database system of claim 10, wherein the one or more processors are further operable to:
    determine the frequency of the data access by determining the last date at which the data was accessed.

12. The database system of claim 9, wherein the one or more processors are further operable to:

determine the first data frequency access measure by creating a plurality of views into data in each table in the database, each view being dependent on the frequency with which data is accessed.

13. The database system of claim 9, wherein the one or more processors are further operable to:
determine the first data frequency access measure by receiving a plurality of values that are included with the query, where the values are indicative of the frequency with which the data was last accessed.

14. The database system of claim 9, wherein the one or more processors are further operable to:
execute a query,
review the intermediate products of the query, and
determine a frequency measure from the intermediate products.

15. The database system of claim 9, wherein the one or more processors are further operable to:
associate each query type with a rule set by grouping similar query types.

16. An article for use in allowing a computer to allocate a strategy for executing a query type, the article comprising a non-transitory computer-readable storage medium including computer-executable instructions that, when executed by a computer, cause the computer to:
obtain a first data frequency access measure which is indicative of a frequency with which data stored in the database is accessed by a first database query type of the database queries;
obtain a second data frequency access measure which is indicative of a frequency with which data stored in the database is accessed by a second database query type of the database queries that is different from the first database query type, wherein the first and second data frequency access measures are each determined based on views, rules, and intermediates products associated with the database queries;
assign at least one processing rule for processing database queries of the first database query type, based on the first data frequency access measure;
assign at least one other processing rule for processing database queries of the second database query type, based on the second data frequency access measure; and
wherein the at least one and at least one other processing rules respectively assign different priorities to execution queries of the first and second database query types.

17. The article of claim 16, further including instructions which cause a computer to:
determine the data frequency access measure by creating a plurality of views into data in the database, each view being dependent on the frequency with which data is accessed.

18. The article of claim 17, further including instructions which cause a computer to:
determine the frequency of the data access by determining the last date at which the data was accessed.

19. The article of claim 16, further including instructions which cause a computer to:
determining the first data frequency access measure by creating a plurality of views into data in each table in the database, each view being dependent on the frequency with which data is accessed.

20. The article of claim 16, further including instructions which cause a computer to:
determine the first data frequency access measure by receiving a plurality of values that are included with the query, where the values are indicative of the frequency with which the data was last accessed.

21. The article of claim 16, further including instructions which cause a computer to:
execute a query,
review the intermediate products of the query, and
determine a frequency measure from the intermediate products.

22. The article of claim 16, further including instructions which cause a computer to:
associate each query type with a rule set by assigning query types that access data with a high access rate to a processing rule set that prioritizes execution of the query.

23. The article of claim 16, further including instructions which cause a computer to:
associate each query type with a rule set by assigning query types that access data with a low access rate to a processing rule set that de-prioritizes execution of the query.

* * * * *